United States Patent
Yoshitoku et al.

(10) Patent No.: US 7,385,911 B2
(45) Date of Patent: Jun. 10, 2008

(54) OPTICAL RECORDING MEDIUM HAVING MULTIPLE LAYERS OF DIFFERENT THERMAL CONDUCTIVITIES

(75) Inventors: Daisuke Yoshitoku, Tokyo (JP); Koji Mishima, Tokyo (JP); Kenji Yamaga, Tokyo (JP); Tsuyoshi Komaki, Tokyo (JP); Shigeru Yamatsu, Tokyo (JP)

(73) Assignee: TDK Corporation, Tokyo (JP)

( * ) Notice: Subject to any disclaimer, the term of this patent is extended or adjusted under 35 U.S.C. 154(b) by 626 days.

(21) Appl. No.: 10/984,961

(22) Filed: Nov. 10, 2004

(65) Prior Publication Data

US 2006/0098562 A1    May 11, 2006

(51) Int. Cl.
G11B 7/24    (2006.01)

(52) U.S. Cl. .................. 369/275.4; 428/64.1

(58) Field of Classification Search ...... None
See application file for complete search history.

(56) References Cited

U.S. PATENT DOCUMENTS

| | | | | |
|---|---|---|---|---|
| 6,083,597 | A * | 7/2000 | Kondo | 428/64.1 |
| 6,345,034 | B1 * | 2/2002 | Kim | 369/275.5 |
| 6,411,593 | B1 * | 6/2002 | Yoon et al. | 369/275.4 |
| 6,449,241 | B1 * | 9/2002 | Seong et al. | 369/275.5 |
| 7,088,666 | B2 * | 8/2006 | Lee et al. | 369/275.3 |
| 7,132,146 | B2 * | 11/2006 | Itoh et al. | 428/64.1 |
| 7,149,176 | B2 * | 12/2006 | Lee et al. | 369/275.3 |
| 7,170,836 | B2 * | 1/2007 | Ma et al. | 369/53.19 |
| 7,180,839 | B2 * | 2/2007 | Lee | 369/47.27 |
| 2003/0137921 | A1 | 7/2003 | Higuchi | |
| 2006/0075419 | A1 * | 4/2006 | Mishima et al. | 369/283 |
| 2006/0098563 | A1 * | 5/2006 | Mishima et al. | 369/275.3 |
| 2006/0099459 | A1 * | 5/2006 | Yoshitoku et al. | 428/824.1 |

FOREIGN PATENT DOCUMENTS

| | | |
|---|---|---|
| JP | 58-158036 | 9/1983 |
| JP | 60-113340 | 6/1985 |
| JP | 63-026853 | 2/1988 |
| JP | 3-57540 | 9/1991 |
| JP | 5-109119 | 4/1993 |
| JP | 8-036783 | 2/1996 |
| JP | 8-203120 | 8/1996 |
| JP | 9-138972 | 5/1997 |
| JP | 2003-048375 | 2/2003 |

OTHER PUBLICATIONS

English language Abstract of JP 60-113340.
English language Abstract of JP 63-026853.
English language Abstract of JP5-109119.
English language Abstract of JP8-203120.
English language Abstract of JP8-036783.
English language Abstract of JP2003-048375.
English language Abstract of JP58-158036.
English language Abstract of JP9-138972.

* cited by examiner

*Primary Examiner*—Tan Dinh
(74) *Attorney, Agent, or Firm*—Greenblum & Bernstein, P.L.C.

(57) ABSTRACT

In an information recording medium according to the present invention, a recording layer, a first layer, and a second layer are formed so that a thermal conductivity of the first layer that contacts one surface of the recording layer and a thermal conductivity of the second layer that contacts another surface of the recording layer are both lower than a thermal conductivity of the recording layer and a track pitch is in a range of 0.1 μm to 0.5 μm, inclusive.

4 Claims, 1 Drawing Sheet

OPTICAL RECORDING MEDIUM HAVING MULTIPLE LAYERS OF DIFFERENT THERMAL CONDUCTIVITIES

BACKGROUND OF THE INVENTION

1. Field of the Invention

The present invention relates to an information recording medium on which recording data is recorded by irradiating a laser beam.

2. Description of the Related Art

An optical information recording medium disclosed by Japanese Laid-Open Patent Publication No. H09-138972 is known as this type of information recording medium. In this optical information recording medium, an intermediate layer, a light absorbing layer, a light reflective layer, and a protective layer (hereinafter, collectively referred to as "functional layers" when no distinction is required) are formed in that order by sputtering or spin coating on a substrate in which grooves have been formed with a track pitch of around 1.6 µm. Here, with this optical information recording medium, by irradiating a laser beam from the substrate side, regions of the light absorbing layer irradiated with the laser beam heat up and expand, causing partial deformation of the intermediate layer and/or the substrate. By doing so, the deformed parts in the intermediate layer and/or the substrate are recorded as recording marks, resulting in recording data being recorded.

However, by investigating the conventional optical information recording medium, the present inventors discovered the following problems. That is, in the conventional optical information recording medium, a reflective layer for reflecting the laser beam irradiated from the substrate (base member) side is formed so as to contact the light absorbing layer. Here, in the optical information recording medium, the reflective layer is formed of a metal film of gold, silver, copper, aluminum, or the like (i.e., a thin film with high thermal conductivity). Here, when the light absorbing layer heats up due to the irradiation of a laser beam during the recording of recording data, such heat is rapidly conducted to the reflective layer. Accordingly, with a conventional optical information recording medium, it is necessary to sufficiently irradiate a laser beam onto the light absorbing layer so that the temperature of the regions of the light absorbing layer that are irradiated with the laser beam rises sufficiently to cause expansion. This means that with the conventional optical information recording medium, there is the problem that if the irradiated amount of the laser beam is too low (i.e., the irradiation time is short) when recording marks are formed, there is the risk of recording errors occurring, so that the high speed recording of recording data is difficult. The conventional optical information recording medium is also constructed with a large number of functional layers that are formed by sputtering or spin coating. Accordingly, since a large number of sputtering or spin coating processes are required to form the large number of functional layers, there is a further problem in that it is difficult to reduce the manufacturing cost of the conventional optical information recording medium due to the large number of manufacturing processes.

SUMMARY OF THE INVENTION

The present invention was conceived in view of the problems described above and it is a principal object of the present invention to provide an information recording medium on which recording data can be recorded at high speed without causing recording errors, and a further object to provide an information recording medium whose manufacturing cost can be reduced.

To achieve the stated objects, in an information recording medium according to the present invention, a recording layer, a first layer, and a second layer are formed so that a thermal conductivity of the first layer that contacts one surface of the recording layer and a thermal conductivity of the second layer that contacts another surface of the recording layer are both lower than a thermal conductivity of the recording layer and a track pitch is in a range of 0.1 µm to 0.5 µm, inclusive.

In this information recording medium, both the first layer and the second layer that directly contact the recording layer are formed so that the thermal conductivities thereof are lower than the thermal conductivity of the recording layer. For this reason, when the recording layer heats up due to irradiation with the laser beam, the situation where the heat of the recording layer is rapidly conducted to the first and/or second layers is avoided. As a result, since it is possible to cause a sufficient rise in temperature for deformation of the recording layer even when the irradiation time of the laser beam is made quite short, it is possible to record the recording data at high speed without causing recording errors. In this case, by forming the track pitch in a range of 0.1 µm to 0.5 µm, inclusive, it is possible to record recording data with a sufficiently high density compared to a conventional optical information recording medium where the track pitch is around 1.6 µm, and therefore the data recording capacity of the information recording medium can be sufficiently increased.

Here, the information recording medium may be constructed so that recording data is recorded by at least one of the first layer and the second layer deforming due to deformation of the recording layer caused by irradiation of a laser beam adjusted to a recording power, and the first layer and the second layer may be formed so that a hardness of a shallower layer out of the first layer and the second layer in an incident direction of the laser beam is higher than a hardness of a deeper layer in the incident direction. With this construction, when the recording layer deforms due to irradiation of the laser beam, it is possible to have the deeper layer in the incident direction deform more than the shallower layer in the incident direction. Accordingly, it is possible to reduce an increase in noise caused by a large deformation in the shallower layer in the incident direction, and as a result, it is possible to sufficiently avoid the occurrence of reproduction errors.

The recording layer may be formed so as to be sandwiched between a support substrate made of resin as the first layer and a light transmitting layer made of resin as the second layer. The expression "support substrate" in this specification refers to a substrate that functions as a support when forming the recording layer or the like. Also, the expression "light transmitting layer" in this specification refers to a resin layer that is formed of resin material that transmits light and that is passed by a laser beam when recording data is recorded and reproduced. With this construction, compared to a conventional optical information recording medium where various functional layers such as an intermediate layer, a light absorbing layer, a light reflective layer, a protective layer, and the like, need to be successively formed, the manufacturing cost of the information recording medium can be sufficiently reduced corresponding to the low number of formation processes for the respective layers including the recording layer.

In addition, a hard coat layer may be formed so as to cover the light transmitting layer. With this construction, damage to the information recording medium is prevented by the hard coat layer.

The recording layer may be composed of a single layer formed using a recording material with two elements Bi and O as main components. It should be noted that the expression "a recording material with the two elements Bi and O as main components" refers to a recording material in which the proportion of the number of atoms occupied by the two elements Bi and O with respect to all of the elements composing the recording material is at least 75%, preferably at least 80%, and more preferably at least 90%. Also, the expression "a recording material with the two elements Bi and O as main components" in the present invention includes materials in which the proportions of the elements composing the recording material are somewhat different. Accordingly, a "single layer" for the present invention includes both a layer in which the proportions of the respective elements composing the recording material are the same across the entire layer, and a layer including parts where the proportions of the respective elements somewhat differ to one another. With this construction, manufacturing is simple and the material cost is comparatively low, so that the manufacturing cost of an information recording medium can be sufficiently reduced.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of an information recording medium according to the present invention will now be described with reference to the attached drawings.

First, the construction of an optical disc 1 will be described with reference to the drawings.

Figure 1:
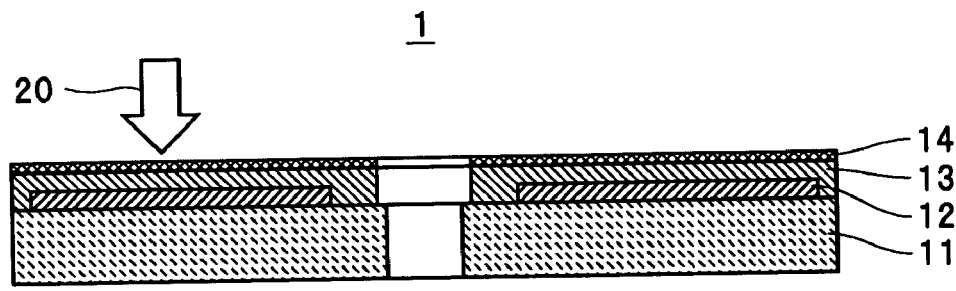
FIG. 1 is a cross-sectional view showing the construction of an optical disc.
Figure 2:
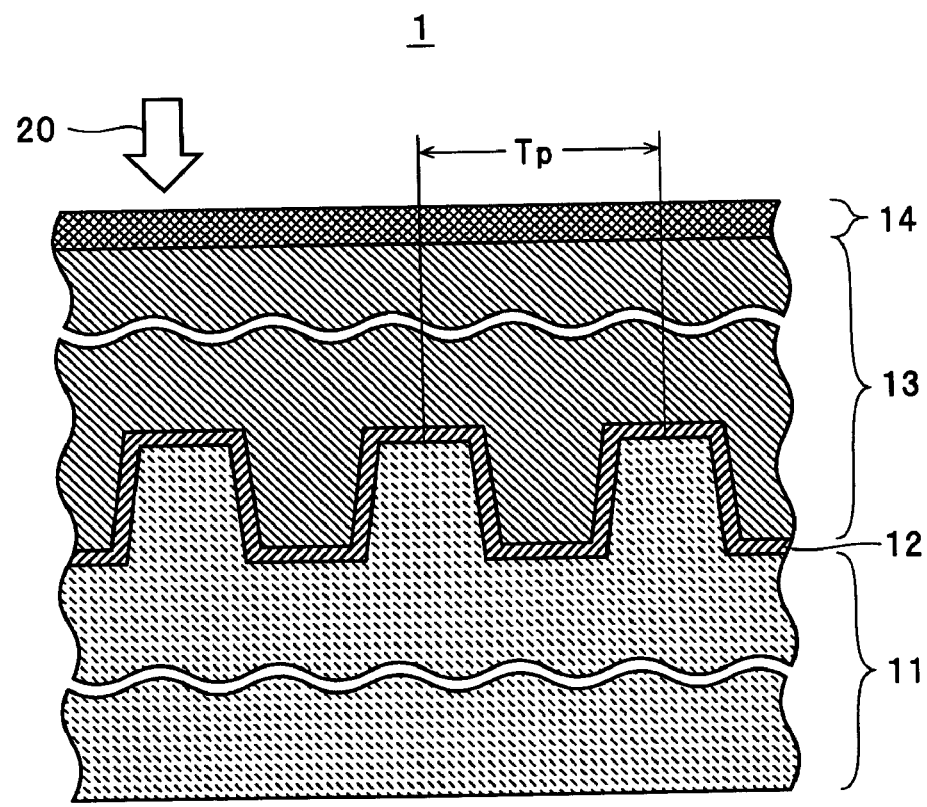
FIG. 2 is another cross-sectional view showing the construction of an optical disc.

The optical disc 1 shown in FIGS. 1 and 2 is a single-sided write-once information recording medium that is one example of the information recording medium according to the present invention and is formed in a disc shape with a diameter of around 120 mm and a thickness of around 1.2 mm. More specifically, in the optical disc 1, a recording layer 12, a light transmitting layer 13, and a hard coat layer 14 are formed in that order on a disc substrate 11, and by irradiating a laser beam 20 from the light transmitting layer 13 side (from the top toward the bottom in both drawings), the recording of recording data on the recording layer 12 and the reproduction of recording data recorded on the recording layer 12 are carried out. In this case, during the recording and reproduction of recording data on the optical disc 1, the laser beam 20 is irradiated with a wavelength in a range of around 380 nm to 450 nm (as one example, the wavelength is 405 nm). Accordingly, as shown in FIG. 2, a groove and land are formed in the disc substrate 11 during injection molding so that a track pitch Tp is in a range of 0.1 μm to 0.5 μm, inclusive (as one example, 0.3 μm) and the optical disc 1 is constructed so that recording data can be recorded or reproduced using the laser beam 20 with the wavelength stated above.

The disc substrate 11 corresponds to a "support substrate as a first layer" for the present invention and composes "a deeper layer in the incident direction" for the present invention. The disc substrate 11 is injection molded in a disc shape with a diameter of 120 mm and a thickness of around 1.1 mm using a predetermined resin material so that the thermal conductivity thereof is lower than the thermal conductivity of the recording layer 12. A convex/concave pattern (a groove and a land) is formed in the surface of the disc substrate 11 so that recording data can be recorded and reproduced by irradiating the laser beam 20 whose wavelength is in a range of around 380 nm to 450 nm. Here, the groove (convex part) that projects toward the side on which the laser beam 20 is irradiated (the incident side) functions as a track for recording and reading recording data on the recording layer 12. Accordingly, to make proper tracking possible, as one example, the groove is formed with a height in a range of 15 nm to 25 nm, inclusive and with a track pitch Tp between adjacent parts of the groove in a range of 0.1 μm to 0.5 μm, inclusive (as one example, 0.3 μm). It should be noted that it is also possible to have the land (the concave part) function as the track, and on such a disc substrate, the land is formed with a depth in the above range of 15 nm to 25 nm, inclusive and with a track pitch between adjacent parts of the land in the above range of 0.1 μm to 0.5 μm, inclusive. It is also possible to have both the groove and the land function as tracks, and on such a disc substrate, the groove and the land are formed so that the depth from the upper surface of the groove on the incident side for the laser beam 20 to the bottom surface of the land is in the above range of 15 nm to 25 nm, inclusive and the track pitch between adjacent parts of the groove and the land is in the above range of 0.1 μm to 0.5 μm, inclusive.

Polycarbonate resin, acrylic resin, epoxy resin, polystyrene resin, polyethylene resin, polyolefin resin, polypropylene resin, silicone resin, fluororesin, ABS resin, urethane resin, and the like, can be given as examples of the resin material used to mold the disc substrate 11. Out of these, by using polycarbonate resin, it is possible to avoid large increases in the molding cost while still being able to mold the disc substrate 11 with a thermal conductivity that is sufficiently lower than the thermal conductivity of the recording layer 12. More specifically, as shown in Table 1 below that shows the thermal conductivity of layers (the substrate and the light transmitting layer) formed of various materials, while the thermal conductivity of the recording layer 12 (bismuth oxide (BiOx) is 2 W/(m·K), the thermal conductivity of the disc substrate 11 molded using polycarbonate (PC) (substrate A in Table 1) is 0.16 W/(m·K). Here, the material forming the disc substrate 11 is not limited to a resin material and various materials (such as glass and ceramics) whose thermal conductivity is lower than the recording layer 12 can be used to form the disc substrate 11. It should be noted that in this specification, the values of thermal conductivity are expressed using values according to JIS A 1412-2.

TABLE 1

| | Material | Thermal Conductivity (W/(m · K)) |
| --- | --- | --- |
| Recording Layer | BiOx | 2 |
| Substrate A | PC | 0.16 |
| Substrate B | $SiO_2$ | 1.1 |
| Substrate C | $Al_2O_3$ | 20 |

TABLE 1-continued

| | Material | Thermal Conductivity (W/(m · K)) |
|---|---|---|
| Light Transmitting Layer A | Mixed Acrylic Resin | 0.5 |
| Light Transmitting Layer B | Mixed Acrylic Resin | 0.62 |
| Reflective layer | Ag | 428 |

The recording layer 12 is composed of a single layer (thin film) with a thickness of around 45 nm that is formed by sputtering using a recording material that has the two elements Bi and O as main components (a recording material where the proportion of Bi and O in the entire recording material is at least 75%, preferably at least 80%, and even more preferably at least 90%). In this case, to improve the recording characteristics, the recording layer 12 of the optical disc 1 is formed so that the proportion of O atoms with respect to the total number of Bi and O atoms is in a range of 63% to 77%, inclusive. The recording layer 12 formed of BiOx has a quite low light absorptance of around 20 to 30%. Accordingly, compared to a recording layer that is formed of a recording material with a light absorptance in excess of 60%, the heating efficiency during the irradiation of the laser beam 20 is quite low. In this case, to sufficiently cause deformation of the recording layer 12 during irradiation of the laser beam 20, it is necessary to cause the temperature of the recording layer 12 to rise to around 300° C. Accordingly, to form recording marks in the recording layer 12 by irradiating the laser beam 20 for a short time (i.e., to record recording data at high speed), it is necessary to prevent the rapid conduction of heat from the recording layer 12 to the disc substrate 11 and the light transmitting layer 13. It should be noted that the thickness of the recording layer 12 is not limited to the thickness stated above, but to obtain a reproduction signal with a sufficient level during the reproduction of recording data, the recording layer 12 should preferably be formed so that the thickness is in a range of 20 nm to 80 nm, inclusive.

The method of forming the recording layer 12 is not limited to sputtering, and it is possible to form the recording layer 12 using vapor phase epitaxy, such as vapor deposition. In this case, the recording material that forms the recording layer 12 is not limited to the BiOx mentioned above, and it is possible to use various kinds of recording material that can deform when irradiated with the laser beam 20 adjusted to the recording power to cause deformation of at least one of the disc substrate 11 and the light transmitting layer 13. More specifically, as examples, the recording layer 12 can be formed using a recording material with a metal element, such as Ag, Cu, Pd, and Zn, and O as main components, or a recording material with one or a plurality of metal elements, such as Bi, Ag, Cu, Pd, Ni, Pt, and Zn, and O as main components.

The light transmitting layer 13 corresponds to a "second layer" for the present invention and composes a "shallower layer in the incident direction" for the present invention. The light transmitting layer 13 is formed by spin coating a UV-hardening resin material with a thickness of 30 to 200 μm, inclusive (as one example, 100 μm). In this case, energy ray-hardened resins such as acrylic UV-hardening resin and epoxy UV-hardening resin can be given as examples of the resin material used for forming the light transmitting layer 13. Out of these, since the thermal conductivity of the acrylic UV-hardening resin is comparatively low and the handling is easy, in this optical disc 1, as one example, the light transmitting layer 13 is formed using a mixed acrylic resin whose thermal conductivity is 0.62 W/(m·K) (the light transmitting layer B in Table 1). It should be noted that the method of forming the light transmitting layer 13 is not limited to spin coating a resin material, and it is possible to form the light transmitting layer 13 by sticking a resin film with a lower thermal conductivity than the thermal conductivity of the recording layer 12 onto the surface of the recording layer 12. The optical disc 1 is also constructed so that the hardness of the light transmitting layer 13 is greater than the hardness of the disc substrate 11. More specifically, while the hardness of the disc substrate 11 that is formed of polycarbonate resin is 21 mgf/μm$^2$, the hardness of the light transmitting layer 13 formed of the mixed acrylic resin mentioned above is 34 mgf/μm$^2$. It should be noted that in this specification, the hardness values are expressed by values produced by a Vickers hardness test. The hard coat layer 14 is formed with a thickness of around 3 μm by spin coating an equivalent resin material as is used to form the light transmitting layer 13 on the surface of the light transmitting layer 13. In this case, to improve the abrasion resistance and damage resistance, as a resin material for forming the hard coat layer 14, it is preferable to use a resin material where the hardening function groups are more polyfunctional than the resin material used for forming the light transmitting layer 13, and a resin material whose molecular weight is lower than that of the resin material used for forming the light transmitting layer 13.

Next, a method of manufacturing and a method of using the optical disc 1 will be described.

First, the disc substrate 11 is injection molded using polycarbonate resin. Next, the recording layer 12 is formed by sputtering on the surface of the disc substrate 11 in which the convex/concave pattern (track) is formed. More specifically, the disc substrate 11 is set in a chamber (not shown) in which a Bi target has been disposed and, 02 gas is then supplied inside the chamber. Next, a sputtering gas such as Ar gas is supplied inside the chamber and collides with the Bi target. At this time, as examples, the flow rate of the O2 gas is set at 20 sccm and the flow rate of the Ar gas is set at 50 sccm. By doing so, the Bi particles are scattered inside the chamber and the Bi accumulates on the surface of the disc substrate 11 (the surface with the convex/concave pattern) while reacting with the O2 gas and oxidizing. As a result, the recording layer 12 composed of a single layer that is around 45 nm thick is formed on the surface of the disc substrate 11. In this case, by appropriately adjusting the sputtering conditions when the recording layer 12 is formed, it is possible to change the proportions of the Bi and O in the recording layer 12 in the various parts in the thickness direction of the recording layer 12. In addition, although it is preferable to construct the recording layer 12 mainly of Bi and O, it is also possible to include other atoms, compounds, or the like, provided that the amount of such is small. In this case, when the included amount of other atoms, compounds, or the like is too high, the relative amount of Bi and O in the recording layer 12 falls, which makes it difficult to form recording marks from which the recording data can be read reliably. Accordingly, the included proportion of other atoms, compounds, or the like aside from Bi and O should preferably be 25% or below, and more preferably 10% or below.

Next, the disc substrate 11 on which the formation of the recording layer 12 has been completed is removed from the chamber and is set in a spin coating apparatus (not shown).

Next, after a UV-hardening resin material for forming the light transmitting layer 13 (in this example, mixed acrylic resin) has been spin coated on the recording layer 12, UV rays or the like are irradiated to cause hardening. By doing so, the light transmitting layer 13 is formed with a thickness of around 100 μm. After this, by spin coating and then hardening a UV-hardening acrylic resin, for example, on the surface of the light transmitting layer 13, the hard coat layer 14 is formed with a thickness of around 3 μm. By doing so, the optical disc 1 shown in FIGS. 1 and 2 is completed.

When recording data is recorded and reproduced on the optical disc 1, as described above, a blue-violet laser beam 20 with a wavelength of around 405 nm is irradiated. More specifically, by irradiating a laser beam 20 that has been adjusted to the recording power from the light transmitting layer 13 side during the recording of recording data, the parts of the recording layer 12 irradiated by the laser beam 20 are heated and expand (deform), and together with this, the disc substrate 11 and the light transmitting layer 13 deform and the optical characteristics of such deformed parts change so that recording marks are formed. In the optical disc 1, the disc substrate 11 and the light transmitting layer 13 that contact the recording layer 12 are both formed with thermal conductivities that are sufficiently lower than the thermal conductivity of the recording layer 12. This means that when the recording layer 12 heats up due to irradiation with the laser beam 20, a situation where the heat is rapidly conducted to the disc substrate 11 and the light transmitting layer 13 is avoided. Accordingly, even when recording data is recorded at high speed (i.e., when the time the laser beam 20 is irradiated onto the recording layer 12 is quite short), the temperature of the recording layer 12 can sufficiently rise for recording marks to be formed, so that recording errors can be sufficiently avoided.

Also, in the optical disc 1, the light transmitting layer 13 (in this example, 34 mgf/μm²) is formed so that the hardness thereof is sufficiently higher than the hardness of the disc substrate 11 (in this example, 21 mgf/μm²). Accordingly, when the recording layer 12 deforms due to the irradiation of the laser beam 20, there is greater deformation in the disc substrate 11 near the interface with the recording layer 12 than in the light transmitting layer 13 near the interface with the recording layer 12. Here, if there is greater deformation in the light transmitting layer 13 near the interface with the recording layer 12, when the laser beam 20 that has been adjusted to the reproduction power has been irradiated, the laser beam 20 is irregularly reflected at the deformed parts, resulting in a large noise component being included in the reproduction signal. On the other hand, if there is greater deformation in the disc substrate 11 near the interface with the recording layer 12, the noise component included in the reproduction signal is comparatively small. Accordingly, by causing the disc substrate 11 (i.e., "a deeper layer in the incident direction" of the laser beam 20) to greatly deform when the recording layer 12 deforms, the occurrence of reproduction errors can be sufficiently avoided.

Next, the relationship between the thermal conductivity of the resin layers that sandwich the recording layer 12 (i.e., the disc substrate 11 and the light transmitting layer 13 in the optical disc 1) and the recording sensitivity of the recording layer 12 will be described.

First, using the various layers shown in Table 1 as the disc substrate 11 and the light transmitting layer 13, the optical discs that are first to fourth embodiments and the optical discs that are first to fourth comparative examples shown in Table 2 are respectively produced so that the respective recording layers 12 are sandwiched by these layers. It should be noted that the method of forming the recording layers 12 is the same as for the optical disc 1 described above, and therefore description thereof is omitted. Here, as described above, the thermal conductivity of the recording layer 12 formed of BiOx (as one example, Bi27O73 (these values are proportions of atoms)) is 2 W/(m·K). Also, the reflective layer is formed of silver (Ag), for example, and the thermal conductivity thereof is 428 W/(m·K). The thermal conductivity of the disc substrate 11 (substrate A) molded with a thickness of 1.1 mm using polycarbonate resin is 0.16 W/(m·K). In addition, for a disc substrate 11 (substrate B) where a thin layer of $SiO_2$ with a thickness of 10 nm is formed by sputtering, for example, on the surface of a disc substrate formed of polycarbonate resin with a thickness of 1.1 mm, the thermal conductivity of the $SiO_2$ thin layer that contacts the recording layer 12 is 1.1 W/(m·K). For a disc substrate 11 (substrate C) where a thin layer of $Al_2O_3$ with a thickness of 10 nm is formed by sputtering, for example, on the substrate of a disc substrate formed of polycarbonate resin with a thickness of 1.1 mm, the thermal conductivity of the thin layer of $Al_2O_3$ that contacts the recording layer 12 is 20 W/(m·K) (i.e., a higher value than the thermal conductivity of the recording layer 12).

TABLE 2

|  | Recording Sensitivity (mW) |
|---|---|
| First Embodiment | 4.5 |
| Second Embodiment | 4.5 |
| Third Embodiment | 4.6 |
| Fourth Embodiment | 4.7 |
| First Comparative Example | 7.0 |
| Second Comparative Example | 8.0 |
| Third Comparative Example | Could not be measured |
| Fourth Comparative Example | Could not be measured |

On the other hand, the light transmitting layers A and B are formed with a thickness of 100 μm by spin coating and then hardening an acrylic resin (UV curing resin) in which the resin materials given below have been mixed with predetermined proportions by weight. The thermal conductivities of the light transmitting layers A and B are as given below.

| [Resin Materials Used] | |
|---|---|
| Resin 1 | ARONIX (REGISTERED TRADEMARK) M-1200 (made by TOAGOSEI CO., LTD) |
| Resin 2 | KAYARA.D (REGISTERED TRADEMARK) TMPTA (made by NIPPON KAYAKU CO., LTD) |
| Resin 3 | LIGHT ESTER HOA (made by KYOEISHA CHEMICAL CO., LTD) |
| Resin 4 | 1-Hydroxycyclohexylphenylketone |

[Proportions by Weight]

Light Transmitting Layer A

Resin 1: Resin 2: Resin 3: Resin 4=40:15:42:3

Light Transmitting Layer B

Resin 1: Resin 2: Resin 3: Resin 4=40:47:10:3

[Thermal Conductivity]

| [Thermal Conductivity] | |
| --- | --- |
| Light Transmitting Layer A | 0.5 W/(m · K) |
| Light Transmitting Layer B | 0.62 W/(m · K) |

The optical discs of the first to fourth embodiments shown in Table 2 and the optical discs of the first to fourth comparative examples are constructed as shown below. In this case, the hard coat layer 14 of the optical disc 1 described above is not formed on the respective optical discs.

First embodiment: an optical disc was formed using substrate A as the disc substrate 11 and light transmitting layer A as the light transmitting layer 13.

Second embodiment: an optical disc was formed using substrate A as the disc substrate 11 and light transmitting layer B as the light transmitting layer 13.

Third embodiment: an optical disc was formed using substrate B as the disc substrate 11 and light transmitting layer A as the light transmitting layer 13.

Fourth embodiment: an optical disc was formed using substrate B as the disc substrate 11 and light transmitting layer B as the light transmitting layer 13.

First comparative example: an optical disc was formed using substrate C as the disc substrate 11 and light transmitting layer A as the light transmitting layer 13.

Second comparative example: an optical disc was formed using substrate C as the disc substrate 11 and light transmitting layer B as the light transmitting layer 13.

Third comparative example: the same combination as the optical disc of the first embodiment was used. However, the optical disc was formed with a reflective layer of Ag provided between the disc substrate 11 and the recording layer 12.

Fourth comparative example: the same combination as the optical disc of the third embodiment was used. However, the optical disc was formed with a reflective layer of Ag provided between the disc substrate 11 and the recording layer 12.

Next, the optical discs were successively set in an optical recording medium evaluation apparatus DDU1000 (made by PULSTEC INDUSTRIAL CO., LTD) and recording marks that are 8 T long were formed on the respective recording layers 12. It should be noted that when forming the recording marks, the laser beam recording power Pw was gradually raised in stages from 3 mW to 10 mW and recording marks were formed for the respective recording powers. The respective jitter of these recording marks was measured and the recording power irradiated when the recording marks with the lowest measured value were formed was set as the optimal recording power. The results are shown as the "Recording Sensitivity" in Table 2. The other recording conditions were set as given below.

Laser beam wavelength: 405 nm
Numeric aperture NA of the objective lens: 0.85
Modulation method: (1,7) RLL
Linear recording velocity: 5.3 m/sec
Channel bit length: 0.12 μm
Channel clock: 66 MHz
Recording method: On-groove recording
Reproduction power: 0.7 mW
Intermediate power: 1.0 mW
Base power: 0.5 mW For the optical discs of the first to fourth embodiments, the disc substrate 11 (or the thin layer of the disc substrate 11 that contacts the recording layer 12) and the light transmitting layer 13 that are formed so as to sandwich the recording layer 12 both have thermal conductivities that are sufficiently lower than the thermal conductivity of the recording layer 12, so that the situation is avoided where heat is rapidly conducted from the recording layer 12 to the disc substrate 11 and the light transmitting layer 13 during irradiation of the laser beam. Accordingly, as shown in Table 2, for the optical discs of the first to fourth embodiments, it is possible to record the recording data with sufficiently low power as demonstrated by the respective recording sensitivities (the power of the laser beam that can form recording marks) of 4.5 mW, 4.5 mW, 4.6 mW, and 4.7 mW. Accordingly, it can be understood that by setting the thermal conductivities of both layers that contact the recording layer 12 lower than the thermal conductivity of the recording layer 12, it is possible to record recording data by irradiating a laser beam of relatively low power onto a recording layer 12 composed of BiOx with a light absorptance of around 30%.

On the other hand, in the optical discs of the first and second comparative examples, the thermal conductivity of the disc substrate 11 (or the thin layer of the disc substrate 11 that contacts the recording layer 12) is higher than the thermal conductivity of the recording layer 12, so that heat is rapidly conducted from the recording layer 12 to the disc substrate 11 when the laser beam is irradiated. Accordingly, with the optical discs of the first and second comparative examples, a high power is required as shown by the recording sensitivities of 7.0 mW and 8.0 mW. Also, in the optical discs of the third and fourth comparative examples, the thermal conductivity of the reflective layer that contacts the recording layer 12 is extremely high compared to the thermal conductivity of the recording layer 12, so that heat is rapidly conducted from the recording layer 12 to the reflective layer when the laser beam is irradiated. For this reason, in the optical discs of the third and fourth comparative examples, the temperature of the recording layer 12 does not sufficiently rise and the recording layer 12 insufficiently deforms, so that it is difficult to form recording marks (i.e., to record recording data). Accordingly, it can be understood that when the thermal conductivity of either of the two layers that contact the recording layer 12 is higher than the thermal conductivity of the recording layer 12, it is necessary to sufficiently raise the power of the laser beam used to form recording marks on the recording layer 12 that is composed of BiOx with a light absorptance of around 30%.

Next, the relationship between the respective hardnesses of the resin layers (the disc substrate 11 and the light transmitting layer 13) that sandwich the recording layer 12 and the recording characteristics will be described.

The 8 T recording marks recorded on the recording layer 12 of the optical discs of the first and second embodiments described above were reproduced and the increase in noise was measured. The measurement results are shown in Table 3. It should be noted that the hardnesses of both optical discs were measured using an ENT1100 Nano Indentation Tester made by ELIONIX CO., LTD with an added load of 200 mgf and a measurement cycle of "load, hold (two seconds), unload". An XK180 spectrum analyzer (made by ADVANTEST CORPORATION) was used to measure the increase in noise. The following conditions were set as the reproduction conditions.

Laser beam wavelength: 405 nm
Reproduction power: 0.7 mW
Numeric aperture NA of the objective lens: 0.85

TABLE 3

|  | Hardness of the light transmitting layer (mgf/$\mu m^2$) | Increase in Noise (dB) |
| --- | --- | --- |
| First Embodiment | 21 | 4.7 |
| Second Embodiment | 34 | 0.7 |

NB: Hardness of Substrate A = 21 mgf/$\mu m^2$

For the optical disc of the first embodiment, the hardness of the light transmitting layer 13 is 21 mgf/$\mu m^2$ which is the same as the hardness of the disc substrate 11 (in this example, the hardness of substrate A is 21 mgf/$\mu m^2$. Accordingly, when the recording layer 12 has deformed due to irradiation of the laser beam during the recording of recording data, the disc substrate 11 and the light transmitting layer 13 both deform by substantially the same amount. Here, since the light transmitting layer 13 deforms, the laser beam irradiated during the reproduction of recording data is irregularly reflected at the deformed parts of the light transmitting layer 13. As a result, for the optical disc of the first embodiment, the increase in noise between before and after the recording of recording data is 4.7 dB. On the other hand, in the optical disc of the second embodiment, at 34 mgf/$\mu m^2$, the hardness of the light transmitting layer 13 is sufficiently higher than the hardness of the disc substrate 11. Accordingly, when the recording layer 12 has deformed due to irradiation of the laser beam during the recording of recording data, the disc substrate 11 deforms more than the light transmitting layer 13. The amount of deformation in the light transmitting layer 13 at parts where the recording marks have been formed is therefore less than in the optical disc of the first embodiment described above. As a result, for the optical disc of the second embodiment, the increase in noise between before and after the recording of recording data is extremely small at 0.7 dB. In this way, it can be understood that by setting the hardness of a shallower layer (the light transmitting layer 13) in the incident direction of the laser beam 20 higher than a deeper layer (the disc substrate 11) in the incident direction, the increase in noise between before and after the recording of recording data can be sufficiently reduced.

In this way, according to the optical disc 1, both the disc substrate 11 and the light transmitting layer 13 that contact the recording layer 12 are formed so that the respective thermal conductivities thereof are lower than the thermal conductivity of the recording layer 12, so that when the recording layer 12 has heated up due to irradiation with the laser beam 20, the situation where heat of the recording layer 12 is rapidly conducted to the disc substrate 11 and/or the light transmitting layer 13 is avoided. As a result, regardless of whether the recording layer 12 is formed with a recording material whose light absorptance is 60% or below (in this example, BiOx whose light absorptance is 30%), it is possible to cause the temperature to rise sufficiently for deformation of the recording layer 12 even when the irradiation time of the laser beam 20 is quite short, which means that it is possible to record recording data at high speed without causing recording errors. In this case, by forming the track pitch Tp in a range of 0.1 $\mu m$ to 0.5 $\mu m$, inclusive (as one example, 0.3 $\mu m$), compared to a conventional optical information recording medium with a track pitch of around 1.6 $\mu m$, it is possible to record recording data at sufficiently high density, so that the data recording capacity of the optical disc 1 can be sufficiently increased. Also, by applying the present invention to an information recording medium whose recording layer has been formed with a recording material with light absorptance in a range of 10% to 60%, inclusive, it is possible to record recording data at sufficiently high speed.

Also, according to the optical disc 1, by forming the disc substrate 11 and the light transmitting layer 13 so that the hardness of the shallower layer (the light transmitting layer 13) in the incident direction of the laser beam 20 is higher than the hardness of the deeper layer (the disc substrate 11) in the incident direction, when the recording layer 12 has deformed due to irradiation of the laser beam 20, the disc substrate 11 can be made to deform more than the light transmitting layer 13. Accordingly, it is possible to reduce the increase in noise caused by large deformation of the light transmitting layer 13, and as a result, the occurrence of reproduction errors can be sufficiently avoided.

In addition, according to the optical disc 1, by forming the recording layer 12 so as to be sandwiched by the disc substrate 11 made of resin as the "first layer" for the present invention and the light transmitting layer 13 made of resin as the "second layer" for the present invention, compared to a conventional optical information recording medium for which various functional layers such as an intermediate layer, a light absorbing layer, a light reflective layer, and a protective layer need to be successively formed, the manufacturing cost of the optical disc 1 can be sufficiently reduced corresponding to the low number of formation processes for the respective layers including the recording layer 12. In this case, by forming the thickness of the light transmitting layer 13 in a range of 30 $\mu m$ to 200 $\mu m$, inclusive, it is possible to carry out high-density recording on the recording layer 12 by emitting a laser beam with a short wavelength ($\lambda$) from an objective lens with a large numeric aperture (NA).

Also, according to the optical disc 1, by forming the hard coat layer 14 so as to cover the light transmitting layer 13, damage to the optical disc 1 can be prevented by the hard coat layer 14.

In addition, according to the optical disc 1, by constructing the recording layer 12 of a single layer formed using a recording material that has the two elements Bi and O as main components, the construction becomes simple and the material cost becomes comparatively cheap, so that the manufacturing cost of the optical disc 1 can be sufficiently reduced.

It should be noted that the present invention is not limited to the construction described above. For example, although an example of an optical disc 1 has been described where recording data is recorded and reproduced by irradiating the laser beam 20 on the recording layer 12 from the side of the light transmitting layer 13 that is formed by spin coating or the like, it is also possible to apply the present invention to an optical disc on which recording data is recorded and reproduced by irradiating the laser beam 20 toward the recording layer from the side of the disc substrate that serves as the light transmitting layer. More specifically, the information recording medium according to the present invention also includes an optical disc in which the recording layer is formed between a disc substrate with a thickness of around 1.1 mm as the light transmitting layer and a thin resin layer formed by spin coating or the like and an optical disc in which the recording layer is formed between a disc substrate that is around 0.6 mm thick as a light transmitting layer and another disc substrate (a so-called "dummy substrate") that is also around 0.6 mm thick. Also, although an example of an optical disc 1 with a single recording layer 12 has been described, it is also possible to apply the present invention to a multilayer information recording medium including a plurality of recording layers that are directly sandwiched by a pair of resin layers (various kinds of resin layers such as injection-molded substrates, resin layers formed by applying a resin material, and resin films). It should be noted that when the present invention is applied to a multilayer information recording medium, the respective thermal conductivities of a pair of resin layers in contact with one or more layers out of the plurality of recording layers should be lower than the thermal conductivity of such recording layers. In addition, the present invention can also be applied to a double-sided information recording medium where light transmitting layers are formed on both front and rear surfaces of the information recording medium. In this case, one or a number of recording layers may be present on the front and rear surface sides.

What is claimed is:

1. An information recording medium, in which a recording layer, a first layer, and a second layer are formed so that a thermal conductivity of the first layer that contacts one surface of the recording layer and a thermal conductivity of the second layer that contacts another surface of the recording layer are both lower than a thermal conductivity of the recording layer and where a track pitch is in a range of 0.1 µm to 0.5 µm, inclusive, wherein the information recording medium is constructed so that recording data is recorded by at least one of the first layer and the second layer deforming due to deformation of the recording layer caused by irradiation of a laser beam adjusted to a recording power, and the first layer and the second layer are formed so that a hardness of a shallower layer out of the first layer and the second layer in an incident direction of the laser beam is higher than a hardness of a deeper layer in the incident direction.

2. An information recording medium according to claim 1,
wherein the recording layer is formed so as to be sandwiched between a support substrate made of resin as the first layer and a light transmitting layer made of resin as the second layer.

3. An information recording medium according to claim 2,
wherein a hard coat layer is formed so as to cover the light transmitting layer.

4. An information recording medium according to claim 1,
wherein the recording layer is composed of a single layer formed using a recording material with two elements Bi and O as main components.

* * * * *